Figure 1:
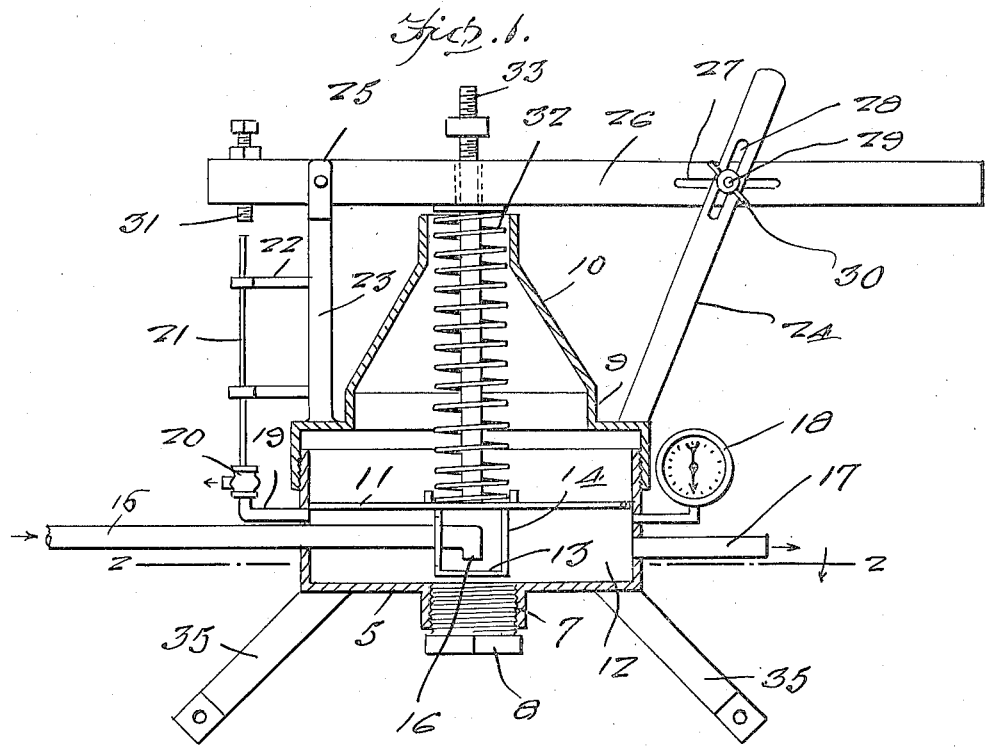

Dec. 8, 1925.

E. LETZRING ET AL 1,564,695

TIRE GAUGE INSTRUMENT

Filed Sept. 28, 1925

Inventors
E. Letzring
Wm Skjerven

By Clarence A. O'Brien
Attorney

Patented Dec. 8, 1925.

1,564,695

UNITED STATES PATENT OFFICE.

ERNEST LETZRING AND WILLIAM SKJERVEN, OF PARK RIVER, NORTH DAKOTA.

TIRE-GAUGE INSTRUMENT.

Application filed September 28, 1925. Serial No. 59,146.

*To all whom it may concern:*

Be it known that we, ERNEST LETZRING and WILLIAM SKJERVEN, citizens of the United States, residing at Park River, in the county of Walsh and State of North Dakota, have invented certain new and useful Improvements in a Tire-Gauge Instrument, of which the following is a specification.

The present invention relates to an instrument to be used in conjunction with the air stations now quite common throughout the country for inflating pneumatic tires.

An important object of the invention is to provide an instrument of this nature which may be set at a desired pressure so that the air supply will be cut off as soon as the pressure in the tire equals the pressure at which the instrument is set, thereby eliminating the necessity of using the common tire gauges which so frequently become lost, or out of place, and in the use of which there is always the danger of over-inflating the tire and blowing the same out.

Another very important object of the invention is to provide an instrument of this nature which is simple in its construction, easy to manipulate, durable, efficient and reliable, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
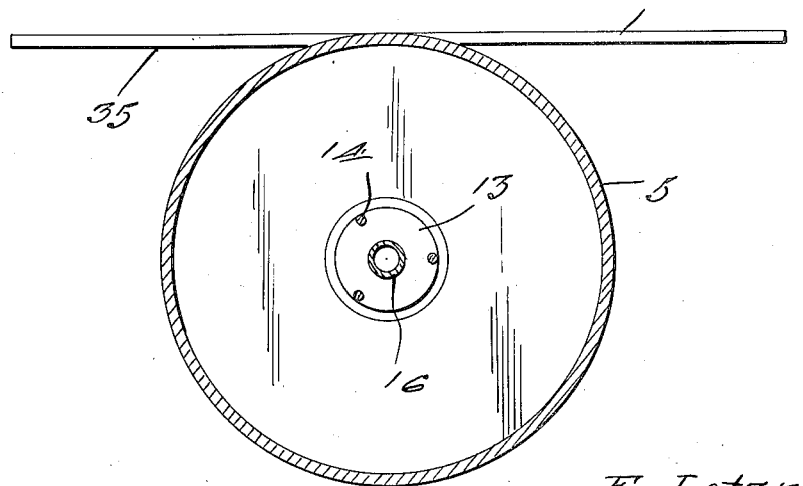

Figure 1 is a vertical section through the instrument embodying the features of my invention, and Figure 2 is a horizontal section taken therethrough substantially on the line 2—2 of Figure 1 looking in the direction of the arrow.

Referring to the drawing in detail, it will be seen that 5 designates a container having a threaded opening 7 in its bottom with a closure plug 8 mounted therein. A cap structure 9 is threadedly engaged over the upper end of the container and has a substantially conical shaped extension 10 rising therefrom. A diaphragm 11 is stretched across the interior of the container 5, and forms a compartment 12 with the bottom of the container, and a portion of the side wall. A valve plate 13 is disposed a distance below the diaphragm, being suspended therefrom by rods 14. A pipe 15 leading from a suitable source of compressed air enters the container 5, and terminates as at 16 above the valve plate 13. A nipple 17 of any suitable construction communicates with the compartment 12 in order that the usual hose may be attached thereto for delivering the air to the pneumatic tire. A pressure gauge 18 also communicates with the compartment 12. A pipe section 19 leads from the compartment, and has a release valve 20 therein which is controllable through a push rod 21 slidable through brackets 22 carried by the upright 23 fixed on the cap structure 9. Another upright 24 rises from the cap structure 9 at a point opposite to the point of location of the upright 23. The upper end of the upright 23 is forked as at 25, and pivotally receives a lever 26 having a slot 27 therein. The upright 24 has a slot 28 therein, and a bolt 29 pierces both the slots 27 and 28, and has a wing nut 30 thereon so that the lever may be locked in different positions in relation to the upright 24. A set screw 31 is threaded through the other end of the lever 26, and is engageable with the upper end of the push rod 21. A coil spring 32 is disposed about a rod 33 which extends through an intermediate portion of the lever 26, downwardly through the extension 10, and cap 9, and is fixed in any suitable manner to the diaphragm 11. The spring 32 impinges against the lever 26, and against the diaphragm 11. It is apparent that this spring may be tensioned by a proper setting of the lever 26 in relation to the upright 24. Suitable brackets 35 extend from the container 5 in order that the instrument may be mounted in a convenient location.

In using the device, the free end of the lever 26 is lifted so that the screw 31 engages the push rod 21 and opens the release valve 20 thereby relieving any pressure which may be in the compartment 12. The lever 26, is immediately swung back or downwardly to tension the spring 32 until the gauge 18 reads properly, that is at the desired pressure, at which time the valve plate 13 will close the outlet end 16 of the pipe 15. The lever 26 is then locked by tightening up on the wing nut 30. The hose, not shown, may then be engaged with the Shrader valve of the pneumatic tire in the usual manner, and if the tire is below the desired pressure, this will relieve the pressure in the compartment 12 so as to equalize it with the pressure of the tire, and of course the valve 13 will open because of the spring 32 and the diaphragm 11, and the air will flow through the pipe 15 until the tire has reached the desired pressure at which time the diaphragm 13 will be flexed upwardly to close the valve 13. This prevents over inflation and allows the tire to be inflated to the proper pressure within very little time without the necessity of continuously disengaging the hose from the tire valve, and testing the tire as is now the common practice.

It is thought that the construction, operation, and advantages of the invention will now be clearly understood without a more detailed description thereof. The present embodiment of the invention has been disclosed merely by way of example since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what we claim is:—

1. An instrument of the class described including a container, an inlet pipe leading into the container, an outlet pipe leading from the container, a pipe section leading from the container, a release valve in the pipe section, a push rod operatively associated with the release valve, a diaphragm controlled valve associated with the inner end of the inlet pipe, a spring associated with the diaphragm controlled valve, a lever for controlling the tension of said spring, a member on the lever engageable with the push rod, and means for holding the lever in different adjusted positions.

2. An instrument of the class described including a container, an inlet pipe leading into the container, an outlet pipe leading from the container, a pipe section leading from the container, a release valve in the pipe section, a push rod operatively associated with the release valve, a diaphragm controlled valve associated with the inner end of the inlet pipe, a spring associated with the diaphragm controlled valve, a lever for controlling the tension of said spring, a member on the lever engageable with the push rod, means for holding the lever in different adjusted positions, and a pressure gauge communicating with the container.

3. An instrument of the class described including a container, a diaphragm across the container, rods extending from the diaphragm, a valve plate supported by said rods, an inlet pipe extending into the container and terminating between the diaphragm and the valve plate so as to be closed by said valve plate, a spring associated with the diaphragm, a lever associated with the spring for tensioning the same, a pressure gauge associated with the container, a bar having a slot, said lever having a slot, a bolt extending through said slots, a nut on the bolt whereby the lever may be held in different adjusted positions for placing the desired tension on the spring, a set screw in the lever, a slidably mounted push rod, a release valve associated with the container, and actuated by the push rod, said container having an outlet.

4. An instrument of the class described including a container, a diaphragm across the container, rods extending from the diaphragm, a valve plate supported by said rods, an inlet pipe extending into the container and terminating between the diaphragm and the valve plate so as to be closed by said valve plate, a spring associated with the diaphragm, a lever associated with the spring for tensioning the same, a pressure gauge associated with the container, a bar having a slot, said lever having a slot, a bolt extending through said slots, a nut on the bolt whereby the lever may be held in different adjusted positions for placing the desired tension on the spring, a set screw in the lever, a slidably mounted push rod, a release valve associated with the container, and actuated by the push rod, said container having an outlet, the bottom of said container being provided with an opening, and a plug threaded into said opening whereby the plug may be taken out in order that access may be had to the valve plate.

In testimony whereof we affix our signatures.

ERNEST LETZRING.
WILLIAM SKJERVEN.